(12) United States Patent
Asanuma et al.

(10) Patent No.: US 6,255,425 B1
(45) Date of Patent: Jul. 3, 2001

(54) SYNDIOTACTIC POLYPROPYLENE COPOLYMER AND EXTRUDED POLYPROPYLENE ARTICLES

(75) Inventors: Tadashi Asanuma, Chiba; Tetsunosuke Shiomura, Tokyo; Nobutaka Uchikawa; Tateyo Sasaki, both of Osaka, all of (JP); Osamu Uchida, Wezembeek-Oppem (BE); Tutomu Iwatani; Shigeru Kimura, both of Osaka (JP); Takeo Inoue, Saitama (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 08/182,348

(22) Filed: Jan. 18, 1994

Related U.S. Application Data

(63) Continuation-in-part of application No. 07/995,908, filed on Dec. 22, 1992, now abandoned, which is a continuation-in-part of application No. 07/956,457, filed on Oct. 2, 1992, now abandoned, which is a continuation of application No. 07/568,054, filed on Aug. 16, 1990, now abandoned, which is a continuation of application No. 07/513,851, filed on Apr. 24, 1990, now abandoned.

(30) Foreign Application Priority Data

| | | |
|---|---|---|
| Apr. 28, 1989 | (JP) | 1-107490 |
| Jun. 1, 1989 | (JP) | 1-137402 |
| Aug. 10, 1989 | (JP) | 1-205785 |
| Aug. 10, 1989 | (JP) | 1-205786 |
| Aug. 24, 1989 | (JP) | 1-216060 |
| Aug. 24, 1989 | (JP) | 1-216061 |
| Sep. 20, 1989 | (JP) | 1-241910 |
| Oct. 27, 1989 | (JP) | 1-278619 |
| Nov. 27, 1989 | (JP) | 1-304683 |

(51) Int. Cl.$^7$ .......................... C08F 210/06; C08F 4/642
(52) U.S. Cl. .................. 526/348; 526/160; 526/348.2; 526/348.3; 526/348.4; 526/348.5; 526/348.6; 526/916; 428/35.5; 428/35.7; 428/36.92; 428/220
(58) Field of Search ................... 526/348.2, 348.3, 526/348.4, 348.5, 348.6, 348, 160, 916; 264/331.17; 428/35.5, 35.7, 36.92, 220

(56) References Cited

U.S. PATENT DOCUMENTS

| | | | | |
|---|---|---|---|---|
| 3,258,455 | * | 6/1966 | Natta et al. | 526/351 |
| 3,305,538 | * | 2/1967 | Natta et al. | 526/351 |
| 3,335,121 | * | 8/1967 | Natta et al. | 526/351 |
| 3,364,190 | * | 1/1968 | Emrick | 526/351 |
| 4,360,650 | * | 11/1982 | Desvignes et al. | 526/348.1 |
| 4,668,753 | * | 5/1987 | Kashiwa et al. | 526/348.1 |
| 4,675,247 | * | 6/1987 | Kitamura et al. | 526/348.1 |
| 4,892,851 | * | 1/1990 | Ewen et al. | 526/160 |

FOREIGN PATENT DOCUMENTS

| | | | | |
|---|---|---|---|---|
| 3726067 | * | 2/1989 | (DE) | . |
| 0 195 505 | | 9/1986 | (EP) | . |
| 0 249 342 | | 9/1986 | (EP) | . |
| 62-119212 | * | 5/1987 | (JP) | 526/160 |
| 1501950 | | 7/1989 | (JP) | . |
| 1502036 | | 7/1989 | (JP) | . |
| WO 8805792 | | 8/1988 | (WO) | . |
| WO 8805793 | | 8/1988 | (WO) | . |
| 0 351 392 | | 1/1990 | (WO) | . |

OTHER PUBLICATIONS

*Journal of the American Chemical Society*, vol. 110, 1988, pp. 6255–6256, American Chemical Society; J.A. Ewen et al.
*English translation furnished.*

* cited by examiner

*Primary Examiner*—Fred Teskin
(74) *Attorney, Agent, or Firm*—Burns, Doane, Swecker & Mathis, L.L.P.

(57) ABSTRACT

A syndiotactic polypropylene copolymer is disclosed which comprises 70 to 99.9 mole % of propylene and 0.1 to 30 mole % of an olefin other than propylene; in the $^{13}$C-NMR spectrum of the syndiotactic polypropylene copolymer, a ratio of the intensity of a peak at about 20.2 ppm to the sum of the intensities of the total peaks attributable to methyl groups in propylene units at about 19–22 ppm being 0.3 or more. Also disclosed are extrusion-molded high-transparency articles, especially films and sheets and blown films, obtained by the extrusion of a polypropylene substantially having a syndiotactic structure.

16 Claims, No Drawings

SYNDIOTACTIC POLYPROPYLENE COPOLYMER AND EXTRUDED POLYPROPYLENE ARTICLES

This is a continuation-in-part of U.S. application Ser. No. 07/995,908 filed Dec. 22, 1992, abandoned, which application is a continuation of U.S. application Ser. No. 07/513,851, filed Apr. 24, 1990, abandoned, which is herein incorporated by reference in its entirety; and a continuation-in-part of U.S. application Ser. No. 07/956,457 filed Oct. 2, 1992, abandoned, which application is a continuation of U.S. application Ser. No. 07/568,054, filed Aug. 16, 1990, abandoned, which is herein incorporated by reference in its entirety.

BACKGROUND OF THE INVENTION (i) Field of the Invention

The present invention relates to a syndiotactic polypropylene copolymer. More specifically, the present invention relates to a copolymer having high syndiotacticity of propylene and another olefin.

The present invention further relates to novel extruded polypropylene articles. Specifically, the present invention is concerned with extruded articles, especially films and sheets and blown films, of a high-syndiotacticity propylene homopolymer or a high-syndiotacticity copolymer of propylene and another olefin.

(ii) Description of the Prior Art

A syndiotactic polypropylene has been known for a long time. Such a conventional polypropylene can be prepared by a low temperature polymerization in the presence of a conventional catalyst comprising a vanadium compound, an ether and an organic aluminum, but this kind of polypropylene is poor in syndiotacticity and scarcely exhibits characteristics of syndiotactic polypropylene. In addition, a copolymer of an α-olefin and propylene is hardly considered to be a crystalline polypropylene. On the other hand, a polypropylene having good tacticity, i.e., a syndiotactic pentad fraction of more than 0.7 as measured by $^{13}$C-NMR has been discovered for the first time by J. A. Ewen et al. which can be obtained by polymerizing propylene in the presence of a catalyst comprising a transition metal (Hf and Zr) compound having an asymmetric ligand and aluminoxane (J. Am. Chem. Soc., 110, 6255–6256, 1988).

The above-mentioned method which has been suggested by J. A. Ewen et al. exhibits high catalytic activity per unit amount of the transition metal, and can provide a polymer having a high tacticity and relatively properly balanced physical properties, but molded articles of this kind of polymer are inconveniently poor in transparency and unsatisfactory in impact resistance.

Isotactic polypropylene has a wide range of utility as molded or otherwise formed articles. As a major application field, it can be used for the production of extruded articles such as sheets and blown films. These sheets and blown films have relatively good physical properties but involve the problem that they are insufficient in transparency. There has hence been a long-standing demand for extruded polypropylene articles, especially sheets and blown films, having better transparency.

SUMMARY OF THE INVENTION

The present inventors have intensively conducted research on a syndiotactic polypropylene having excellent impact resistance balance and good transparency by which the above-mentioned problems can be solved, and as a result, they have achieved the present invention. The present invention is directed to a syndiotactic polypropylene copolymer comprising 70 to 99.9 mole % of propylene and 0.1 to 30 mole % of an olefin other than propylene; in the $^{13}$C-NMR spectrum of the syndiotactic polypropylene copolymer, a ratio of the intensity of a peak at about 20.2 ppm to the sum of the intensities of the total peaks attributable to methyl groups in propylene units at about 19–22 ppm being 0.3 or more.

The $^{13}$C-NMR spectrum can be obtained by measuring in a 1,2,4-trichlorobenzene solution of the copolymer on the basis of tetramethylsilane, and the ratio of the intensity of the peak at about 20.2 ppm to the sum of the intensities of the total peaks attributable to the methyl groups in the propylene units at about 19–22 ppm is a measure for indicating the syndiotacticity of the copolymer. It is known that the syndiotacticity can be defined as a syndiotactic pentad fraction obtained by analyzing the $^{13}$C-NMR spectrum of the homopolymer of propylene (A. Zambelli et al., Macromolecules, Vol. 6, 687, 1973, and the same, Vol. 8, 925, 1975). On the contrary, in the present invention, the above ratio denotes a degree of the syndiotacticity of the propylene chain in the copolymer, and the larger the ratio is, the higher the syndiotacticity of the copolymer.

Molded articles manufactured from the copolymer of the present invention are excellent in transparency and impact resistance as compared with molded products obtained from a conventional syndiotactic polypropylene.

An object of the present invention is to provide novel extruded polypropylene articles having extremely good transparency. Another object of the present invention is to provide novel extruded polypropylene films and sheets and novel blown polypropylene films, which have extremely good transparency and relatively good strength.

Other objects of the present invention will become apparent from the following description.

In one aspect of the present invention, there is thus provided an extruded article formed by the extrusion of a polypropylene substantially having a syndiotactic structure.

The polypropylene substantially having the syndiotactic structure may preferably be a propylene copolymer whose peak intensity observed at about 20.2 ppm on a $^{13}$C-NMR absorption spectrum as measured in the form of a 1,2,4-trichlorobenzene solution while using tetramethylsilane as a standard is at least 0.5 of the sum of all peak intensities corresponding to the respective methyl groups of propylene.

The extruded article of the polypropylene substantially having the syndiotactic structure may preferably be a film or sheet having a thickness of 0.005–5 mm or a blown film having a thickness of 0.001–1 mm.

DETAILED DESCRIPTION OF THE INVENTION

One example of a catalyst used to manufacture a propylene copolymer of the present invention is a catalyst comprising a transition metal compound having an asymmetric ligand and aluminoxane described in the aforesaid literature. In addition, another catalyst can also be used, so long as it can provide the homopolymer of propylene having a relatively high tacticity, i.e., a syndiotactic pentad fraction of about 0.7 or more.

Examples of the catalyst which can be used to manufacture the copolymer of the present invention include transition metal compounds mentioned in the aforesaid literature, i.e., isopropyl(cyclopentadienyl-1-fluorenyl)hafnium dihalogenides and isopropyl(cyclopentadienyl-1-fluorenyl) zirconium dihalogenides as well as these transition metal compounds in which at least one of halogen atoms is substituted with alkyl group. Furthermore, examples of the aluminoxane include compounds represented by the general formula

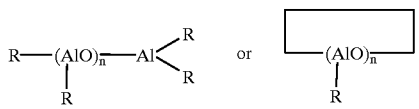

wherein R is a hydrocarbon residue having 1 to 3 carbon atoms. In particular, a methylaluminoxane is suitably used in which R is a methyl group and n is 5 or more, preferably 10 or more. The amount of the aluminoxane is 10 to 1,000,000 mole times, usually 50 to 5000 mole times as much as that of the transition metal compound. In addition to the above-mentioned catalysts, other catalysts can also be used which comprise combinations of boron compounds shown in, for example, Japanese Laid-open Patent Publication Nos. 1-501950 and 1-502036 and the transition metal compounds in which at least one of the halogen atoms is substituted with an alkyl group.

The employment of the above-mentioned catalysts permits copolymerizing propylene and another olefin at an extremely high random level, whereby the copolymer of the present invention can be characterized.

Examples of olefins other than propylene in the present invention include α-olefins having 2 and 4 to 25 carbon atoms which are ethylene and α-olefins represented by the general formula $H_2C=CH-(CH_2)_nCH_3$ (n is a value of 1 to 22)

and α-olefins represented by a formula where the $-(CH_2)_nCH_3$ group in the above-mentioned formula is replaced with a branched alkyl group, for example, branched α-olefins such as 3-methylbutene-1,4-methylpentene-1 and 4,4-dimethyl-pentene- 1. They may be used in combination of two or more thereof on the condition that the total of these olefins is in the range of 0.1 to 30 mole % of all the constitutional monomers.

Preferable examples of the olefins other than propylene include ethylene, butene, 4-methylpentene-1, hexene-1, a combination of ethylene and butene, and a combination of ethylene and an α-olefin having 6 carbon atoms.

No particular restriction is put on polymerization conditions for the manufacture of the copolymer of the present invention, and various polymerization techniques are utilizable such as a solvent polymerization using an inert solvent, mass polymerization in which there is substantially no inert solvent, and gas phase polymerization. Usually, the polymerization temperature is from −100 to 200° C. and the polymerization pressure is from atmospheric pressure to 100 kg/cm²G, and preferably the temperature is from −100 to 100° C. and the pressure is from atmospheric pressure to 50 kg/cm²G. The polymerization is carried out substantially in one step, and the resulting copolymer is the so-called random copolymer.

In the present invention, it is important that amounts of the monomers are controlled so that a ratio of the α-olefin other than propylene to the total constitutional monomer units of the copolymer is from 0.1 to 30 mole % and that in the $^{13}$C-NMR spectrum of the copolymer, a ratio of the intensity of a peak at about 20.2 ppm to the sum of the intensities of the total peaks attributable to methyl groups in propylene units at about 19–22 ppm is 0.3 or more.

In order to meet the conditions regarding the $^{13}$C-NMR spectrum of the copolymer, it has been found that the preparation of the copolymer should be carried out as follows:

Copolymerization is effected by the use of a high-purity transition metal compound and a relatively small amount of the α-olefin other than propylene at a relatively low temperature. In this case, the resulting copolymer already meets the above-mentioned requirements of the $^{13}$C-NMR spectrum, even if not subjected to a post-treatment such as washing with a solvent. The above-mentioned copolymerization conditions are such that a homopolymer having a syndiotactic pentad fraction of 0.7 or more is obtained by homopolymerizing propylene. Concretely speaking, the purity of the transition metal compound is usually 90% or more, although this value may vary depending upon the activity of existing impurities, and the amount of the α-olefin other than propylene is usually 10% by weight or less. Furthermore, the polymerization temperature is 100° C. or less.

When the copolymer obtained by the copolymerization does not meet the above-mentioned requirements of the $^{13}$C-NMR spectrum, the copolymer should be washed with a solvent, whereby the requirements can be met. The solvent which can be used in the present invention is one that can dissolve or disperse the low-molecular atactic component, and examples of the solvent include hydrocarbons having 3 to 20 carbon atoms, alcohols having 1 to 20 carbon atoms, and ethers and esters having 2 to 20 carbon atoms. Examples of these hydrocarbons include propylene itself, saturated hydrocarbons such as propane, butane, pentane, hexane, heptane, octane and nonane, aromatic hydrocarbons such as benzene, toluene, xylene and ethylbenzene, and other hydrocarbons in which a part or all of hydrogen atoms are substituted with a halogen such as fluorine, chlorine, bromine or iodine. Examples of the alcohols include methanol, ethanol, propanol, butanol, pentanol, hexanol and benzyl alcohol. Examples of the ethers include diethyl ether, dipropyl ether, dibutyl ether, dipentyl ether, dihexyl ether and diphenyl ether, and examples of the esters include methyl acetate, ethyl acetate, propyl acetate, butyl acetate, ethyl benzoate and butyl benzoate.

Any washing technique can be used without particular restriction, so long as it permits dissolving a part of the copolymer which is soluble in the solvent and separating the soluble portion from the insoluble portion. In the present invention, there can be employed a usual process of dispersing the copolymer in the solvent and then separating the soluble portion from the insoluble portion by decantation, centrifugation or filtration, or a process of using a countercurrent washing tower in which the copolymer is brought into contact with the solvent in a countercurrent way. A washing temperature can be optionally selected from temperatures which are lower than the melting point of the copolymer and at which the solvent is in the liquid state, and it is generally in the range of 0 to 100° C. Usually, the washing is carried out at ambient temperature. In one washing operation, the amount of the solvent is preferably equal to or more than the apparent volume of the copolymer. If the above-mentioned requirements of the $^{13}$C-NMR spectrum cannot be met by one washing operation, it is necessary to repeat this washing operation several times.

When in the $^{13}$C-NMR spectrum of the syndiotactic polypropylene copolymer, a ratio of the intensity of a peak at about 20.2 ppm to the sum of the intensities of the total peaks attributable to methyl groups in propylene units at about 19–22 ppm is less than 0.3, molded products of this copolymer are poor in transparency and impact resistance, and in addition, the surfaces of the molded articles become sticky.

When a ratio of the α-olefin other than propylene to the total constitutional monomer units of the copolymer is less than 0.1 mole %, the impact resistance and transparency of the copolymer are poor, and conversely when it is in excess of 30 mole %, stiffness deteriorates. considering a balance between the stiffness and the impact resistance as well as transparency, it is preferred that the ratio of the α-olefin other than propylene to the total constitutional monomer units of the copolymer is in the range of 0.1 to 30 mole %.

In the case that the constitutional unit other than propylene is only ethylene, the amount of the ethylene unit is preferably from 0.1 to 20% by weight; in the case of butene only, it is preferably from 0.13 to 30% by weight; in the case of 4-methylpentene-1 only and in the case of hexene-1 only, it is preferably from 0.19 to 30% by weight; in the case of ethylene and butene, the amount of the ethylene unit is preferably from 0.1 to 20% by weight and that of the butene unit is preferably 0.13 to 20% by weight; and in the case of ethylene and an olefin having 6 carbon atoms, the amount of the ethylene unit is preferably from 0.1 to 20% by weight and that of the olefin unit is preferably from 0.19 to 20% by weight.

Furthermore, in the case that the constitutional unit other than propylene is ethylene, butene, 4-methylpentene-1 or hexene-1 only, it is preferred that in the $^{13}$C-NMR spectrum of the syndiotactic polypropylene copolymer, the ratio of the intensity of a peak at about 20.2 ppm to the sum of the intensities of the total peaks at about 19–22 ppm is 0.5 or more.

When ethylene and butene, or ethylene and an α-olefin having 6 carbon atoms are used as the α-olefins other than propylene to achieve terpolymerization, the transparency of the products is further improved.

In the present invention, no particular restriction is put on the molecular weight of the copolymer, so long as the copolymer can be utilized as a usual polymer, but in general, it is preferred that the molecular weight of the copolymer is 0.05 or more in terms of an intrinsic viscosity measured in a tetralin solution at 135° C., or about 1000 or more in terms of a number average molecular weight measured by gel permeation chromatography and corrected in terms of propylene.

The term "polypropylene substantially having a syndiotactic structure" as used herein embraces propylene homopolymer and copolymers of propylene and other olefins having 2–25 carbon atoms, said homopolymer and copolymers substantially having a syndiotactic structure. Examples of the olefins other than propylene include ethylene; and olefins having 4–20 carbon atoms and represented by the formula: $CH_2=CH-R$ in which R is a linear or branched alkyl group having 2–18, preferably 2–12 carbon atoms, including specifically linear olefins such as butene-1, pentene-1, hexene-1, heptene-1, octene-1, nonene-1, decene-1, undecene-1, dodecene-1, tridecene-1, pentadecene-1, hexadecene-1, heptadecene-1 and octadecene-1, and branched olefins such as 3-methylbutene-1, 4-methyl-pentene-1,4,4-dimethylpentene-1. Recurring units derived from these olefins may preferably amount to about 20 wt. % or less, preferably 0–15 wt. % of the corresponding copolymers. These copolymers can provide extruded articles which still have improved transparency.

The propylene homopolymer substantially having the syndiotactic structure may preferably have a syndiotactic pentad fraction of at least 0.7, notably at least 0.8 as measured by $^{13}$C-NMR in the form of a solution in 1,2,4-trichlorobenzene. Further, the propylene copolymers substantially having the syndiotactic structure may preferably have a peak intensity, which is observed at about 20.2 ppm on a $^{13}$C-NMR absorption spectrum as measured in the form of a 1,2,4-trichlorobenzene solution while using tetramethylsilane as a standard, of at least 0.5, especially at least 0.6 of the sum of all peak intensities corresponding to the respective methyl groups of propylene. Propylene homopolymer whose syndiotactic pentad fraction is smaller than 0.7 does not have sufficient characteristics as crystalline polypropylene, and its physical properties are poor. Such polypropylene homopolymer is therefore not preferred. Propylene copolymers whose peak intensity ratios as defined above are smaller than 0.5 have not only poor physical properties but also problems such that articles extruded from them have sticky surfaces.

The molecular weight of the propylene homopolymer or copolymer substantially having the syndiotactic structure may be preferably 0.1–10, more preferably 0.5–5.0, most preferably 0.5–3.0 as an intrinsic viscosity measured at 135° C. in the form of a tetralin solution. Further, the ratio Mw/Mn of the weight average molecular weight (Mw) of the above homopolymer or copolymer to its number average molecular weight (Mn), both measured at 135° C. by gel permeation chromatography, may preferably range from 1.5 to 15.

As a production process for the propylene homopolymer or copolymer substantially having the syndiotactic structure, the above-described process of J. A. Ewen et al. may be mentioned by way of example. Any catalysts other than those proposed by Ewen et al. can be used as long as they can provide syndiotactic polypropylene having a syndiotactic pentad fraction greater than 0.7 as a result of polymerization of propylene alone.

The polymerization processes featuring the use of the catalysts described above can also be applied for the production of copolymers of propylene and other olefins.

Among the processes for obtaining propylene homopolymer or copolymers, it is the process featuring the use of a polymerization catalyst composed of a transition metal compound, which contains an asymmetric ligand, and an aluminoxane that can give propylene homopolymer and copolymers having a syndiotactic structure of relatively good tacticity. Examples of the transition metal compound containing an asymmetric ligand include isopropyl (cyclopentadienyl-1-fluorenyl)-hafnium dichloride, isopropyl (cyclopentadienyl-1-fluorenyl) zirconium dichloride, and those obtained by replacing one or two of the chlorine atoms with other halogens or $C_{1-5}$ alkyl groups.

Illustrative of the aluminoxane include compounds represented by:

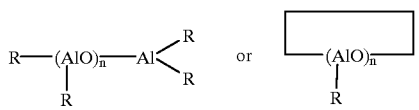

wherein R represents a $C_{1-3}$ hydrocarbon residue. In particular, compounds in which R is a methyl group and n is at least 5, especially 10–100 are employed preferably.

The aluminoxane may be used in an amount of 10–1,000,000, preferably 50–5,000 molar times the amount of the associated transition metal compound.

No particular limitation is imposed on the conditions for the polymerization. The polymerization can be conducted by solution polymerization in a known inert solvent, by bulk polymerization in a polymerization system substantially free of any inert solvent, or by gas-phase polymerization.

Usually, the polymerization temperature may range from −100° C. to 200° C. while the polymerization pressure ranges from normal pressure to 100 kg/cm$^2$-G. Polymerization at from −100° C. to 100° C. under from normal pressure to 50 kg/cm$^2$-G is particularly preferred.

By polymerizing propylene alone or propylene and another olefin in the presence of the polymerization catalyst under the polymerization conditions, the above-described propylene homopolymer or copolymer can be obtained.

To further improve the syndiotacticity fraction of the homopolymer or copolymer, it is effective to wash the homopolymer or copolymer with a hydrocarbon solvent having 3–20 carbon atoms. Examples of the hydrocarbon solvent include propylene itself, saturated hydrocarbons such as propane, butane, pentane, hexane, heptane, octane and nonane, aromatic hydrocarbon compounds such as benzene, toluene, xylene and ethylbenzene, and those obtained by partly or entirely replacing their hydrogen atoms with fluorine, chlorine, bromine and/or iodine atoms. Other usable solvents include those capable of either dissolving or dispersing low molecular-weight atactic components such as alcohols having 1–20 carbon atoms, ethers having 2–20 carbon atoms, and esters. No particular limitation is imposed on the manner of washing. The washing is generally conducted at 0–100° C.

Polymerization at a relatively low temperature, generally 100° C. or lower in the presence of a catalyst having high purity, normally 90% or higher is also effective for obtaining homopolymer or copolymers having a high syndiotacticity fraction.

The propylene homopolymer or copolymer obtained by the above-described process and having a syndiotactic structure may be blended with one or more of various known additives, for example, antioxidants, lubricants, ultraviolet absorbers, ultraviolet stabilizers, heat stabilizers, antistatic agents, organic or inorganic pigments. The resultant composition is optionally granulated, followed by extrusion into various articles. No particular limitation is imposed on the method of extrusion, and various known methods can be employed. To obtain a film and sheet by way of example, there is employed an apparatus which comprises an ordinary extruder and a die having a profile required for obtaining the desired sheet and fitted on the extruder. The thickness of the invention film and sheet obtained as described above may preferably range from 0.005 mm to 5 mm. It is preferred to add a nucleating agent to the propylene homopolymer or copolymer of the syndiotactic structure before extrusion and/or to cool the thus-extruded film and sheet in a special manner, because such propylene homopolymer or copolymer has a relatively low crystallization velocity. The extruded film may also be used as a material for secondary processing such as biaxial stretching or pressure/vacuum forming.

Preferred exemplary nucleating agents include metal salts of aromatic monocarboxylic acids such as benzoic acid, toluic acid, and p-tert-butylbenzoic acid; dibenzylidenesorbitols such as 1,3•2,4-di-(benzylidene) sorbitol, 1,3•2,4-di (p-methyl-benzylidene)sorbitol, and 1,3•2,4-di(p-ethyl-benzylidene)sorbitol; metal salts of aromatic phosphoric acid compounds, such as sodium bis(4-tert-butylphenyl) phosphate and sodium methylenebis(2,4-di-tert-butylphenol)phosphate; high molecular weight compounds having a high melting point, such as polyvinylcyclohexane, poly-3-methylbutene, crystalline polystirene and polytrim-ethylvinylsilane; and quinacridones such as 2,3-quinacridone, dihydroxyquinacridone and acetylated quinacridone. Further, inorganic compounds such as talc, kaolin and mica can also be used preferably. These nucleating agents can be used either singly or in combination.

As a preferred method for cooling an extruded film and sheet, it is sufficient to bring the film or sheet into close contact with conventional cooling rolls. Here, the cooling temperature may be suitably controlled. For a thick sheet, cooling can be carried out using a medium having a large heat capacity such as water.

To produce a blown film of the present invention, it is possible to apply, as is, a process widely used for the production of blown polyolefin films. Namely, a composition obtained by adding desired additives to the above-described propylene homopolymer or copolymer is extruded in a cylindrical form. An inert gas such as nitrogen is blown into the cylindrical extrudate, whereby the cylindrical extrudate is stretched. The thus-stretched cylindrical extrudate is flattened by guide plates and is then taken up on pinch rolls. To extrude the composition in the cylindrical form, there is employed an apparatus constructed by fitting a circular die on a conventional extruder. Upon practice of the blow-film extrusion, various techniques known to those skilled in the art can also be used as desired. The thickness of the blown film of this invention obtained as described above may generally range from 0.001 mm to 1 mm.

Other extruded articles of the present invention, for example, tubes, rods and extruded articles having miscellaneous profiles can be produced similarly by methods well known to artisans. Production processes for these various molded articles are described in detail, for example, in "Oshidashi Seikei (Extrusion)", Chief Editor: Kenkichi Murakami, Kabushiki Kaisha Plastic Age.

In the present invention, the propylene homopolymer or copolymer substantially having a syndiotactic structure can be replaced partly, for example, to an extent less than 50 wt. %, preferably up to 40 wt. % by a propylene homopolymer or copolymer having an isotactic structure. If the proportion of the latter propylene homopolymer or copolymer becomes 50 wt. % or higher, the impact strength is reduced. The latter propylene homopolymer or copolymer can be produced by any one of suitable known processes. One having an isotactic pentad fraction of at least 0.9 as measured by $^{13}$C-NmR can be used preferably. Extruded articles having high stiffness can be obtained by substituting a propylene homopolymer or copolymer having an isotactic structure for a part of a propylene homopolymer or copolymer substantially having a syndiotactic structure.

The present invention will hereinafter be described in further detail by examples and comparative examples. It is however to be noted that the following examples are merely illustrative and not limiting the present invention.

EXAMPLE 1

In 1 liter of toluene in a 2-liter autoclave were dissolved 5 mg of isopropyl(cyclopentadienyl-1-fluorenyl)-zirconium dichloride and 0.67 g of methylaluminoxane having a polymerization degree of about 15. Here, the aforesaid isopropyl (cyclopentadienyl-1-fluorenyl)zirconium dichloride was that which was obtained by introducing lithium into isopropylcyclopentadienyl-1-fluorene synthesized in an ordinary manner and then reacting the same with zirconium tetrachloride, and the aforesaid methylaluminoxane was that which was obtained by reacting copper sulfate hexahydrate with trimethylaluminum in toluene. Afterward, propylene was added to the resulting solution at 30° C. until a level of 2 kg/cm²G had been reached, and ethylene was then added thereto at this temperature at a ratio of 1.0 g/minute over 1 minute at an interval of 10 minutes, while propylene was added so that polymerization pressure might always be 2 kg/cm²G, in order to continue polymerization for 1 hour. After the unpolymerized monomers had been purged, the autoclave was opened, and the contents thereof were filtered under suction at 25° C. by the use of a device comprising a Nutsche and a filter bottle. Next, 1 liter of toluene was added to the resulting powdery copolymer on the Nutsche, followed by filtering under suction, and this operation as repeated at 25° C. 5 times. After this washing step, the copolymer was dried at 80° C. under reduced pressure in order to obtain 32 g of the powdery copolymer. According to $^{13}$C-NMR analysis, it was confirmed that the ethylene unit was present in a ratio of 7.4% by weight (10.7 mole %) in the copolymer. With regard to binary units in the copolymer, propylene-propylene was present in a ratio of 0.828, propylene-ethylene in a ratio of 0.130, and ethylene-ethylene in a ratio of 0.042. With regard to three-component units, propylene-propylene-propylene was present in a ratio of 0.861, propylene-propylene-ethylene in a ratio of 0.012, ethylene-propylene-ethylene in a ratio of 0.020, ethylene-ethylene-ethylene in a ratio of 0.008, ethylene-ethylene-propylene in a ratio of 0.041, and propylene-ethylene-propylene in a ratio of 0.058, which indicated that the copolymer was very rich in random properties. A ratio of the intensity, of a peak at about 20.2 ppm to the sum of the intensities of the total peaks at about 19–22 ppm was 0.89. Furthermore, the intrinsic viscosity (hereinafter referred to as "η") of the copolymer measured in a tetralin solution at 135° C. was 1.26, and a ratio of a weight average molecular weight to a number average molecular weight (hereinafter referred to as "MW/MN") measured in a 1,2,4-trichlorobenzene solution at 135° C. was 2.2. The resulting copolymer powder was then press-molded at 210° C. in order to form a sheet having a thickness of 1 mm, and properties and physical properties were measured as follows:

| | |
|---|---|
| Flexural stiffness (kg/cm²) | ASTM D747 (23° C.) |
| Tensile yield strength (kg/cm²) | ASTM D638 (23° C.) |
| Elongation (%) | ASTM D638 (23° C.) |
| Izod impact strength (notched) (kg · cm/cm) | ASTM D256 (23° C., −10° C.) |
| Haze (%) | ASTM D1003 |

The flexural stiffness was 2800 kg/cm², the tensile yield strength was 200 kg/cm², the elongation was 773%, and values of Izod impact strength were 68 and 2.1 kg·cm/cm (at 23° C. and −10° C., respectively), and the haze was 44%.

COMPARATIVE EXAMPLE 1

The same polymerization used in Example 1 was repeated except that no ethylene was used, thereby obtaining a polymer, and the latter was then subjected to post-treatment to form a sheet. For the polymer and the sheet, properties and physical properties were measured. As a result, η was 1.28, syndiotactic pentad fraction was 0.92, MW/MN was 2.1, flexural stiffness was 4700 kg/cm², tensile yield strength was 224 kg/cm², elongation was 740%, values of Izod impact strength were 14.1 and 2.1 kg·cm/cm (at 23° C. and −10° C., respectively), and haze was 68%.

EXAMPLE 2

In a 5-liter autoclave was placed 1500 g of propylene, and 10 mg of isopropyl(cyclopentadienyl-1-fluorenyl)zirconium dichloride and 1.34 g of methyl-aluminoxane having a polymerization degree of about 15 were then injected thereinto at 30° C. The mixture was stirred for 1 hour, while ethylene was added thereto every 2 g at 30° C. at an interval of 10 minutes, so as to carry out polymerization, and the unpolymerized propylene was then purged. Afterward, the autoclave was opened, and the resulting powdery copolymer was taken out and dispersed in 500 ml of hexane. The dispersion was then filtered under suction at 40° C. by the use of a Nutsche and a filter bottle. Next, 500 ml of hexane was added to the powdery copolymer on the Nutsche, followed by filtering under suction, and this operation was repeated at 25° C. 3 times. After this washing step, the copolymer was dried at 80° C. under reduced pressure in order to obtain 145 g of a syndiotactic polypropylene copolymer. For the copolymer and a sheet obtained by press-molding the same, properties and physical properties were measured as in Example 1. As a result, η was 1.33, an ethylene unit was present in a ratio of 7.5% by weight (10.8 mole %) in the copolymer, a ratio of the intensity of a peak at about 20.2 ppm to the sum of the intensities of the total peaks at about 19–22 ppm was 0.88, MW/MN was 2.3, flexural stiffness of the sheet was 2100 kg/cm², tensile yield strength was 200 kg/cm², elongation was 820%, and values of Izod impact strength were 78 and 3.2 kg·cm/cm (at 23° C. and −10° C., respectively), and haze was 38%.

COMPARATIVE EXAMPLE 2

The same procedure as in Example 2 was effected except that no ethylene was used, thereby obtaining a polymer, and the latter was then subjected to post-treatment to form a sheet. For the polymer and the sheet, properties and physical properties were measured. As a result, η was 1.26, syndiotactic pentad fraction was 0.93, MW/MN was 2.1, and flexural stiffness was 5200 kg/cm², tensile yield strength was 223 kg/cm², elongation was 785%, values of Izod impact strength were 18.5 and 2.7 kg·cm/cm (at 23° C. and −10° C., respectively), and haze was 62%.

EXAMPLE 3

In a 2-liter autoclave, the same amount of the same catalyst as in Example 1 was dissolved in 1 liter of toluene, and propylene was placed therein at 30° C. until a level of 5 kg/cm²G had been reached. Afterward, 45 g of butene-1 was injected thereinto at the same temperature, and polymerization reaction was carried out at 30° C. for 2 hours, while propylene was added thereto so that the polymerization pressure might always be 5 kg/cm²G. After the unpolymerized monomers had been purged, the autoclave was opened, and the contents thereof were filtered, washed with toluene (1 liter, 5 times) and dried in the same manner as in Example 1, thereby obtaining 64.3 g of a powdery copolymer. According to $^{13}$C-NMR analysis, it was confirmed that the butene-1 unit was present in a ratio of 15.1% by weight (11.8 mole %) in the copolymer, a ratio of the intensity of a peak at about 20.2 ppm to the sum of the intensities of the total peaks at about 19–22 ppm was 0.84, η was 1.23, and MW/MN was 2.1. In accordance with differential scan thermal analysis, the copolymer melted at 140° C. and the temperature was then dropped at a rate of 10° C./minute, and in this case, the crystallization temperature measured as a peak temperature was 75.6° C. and melting points at the time when temperature was raised were 121° C. and 130° C. The copolymer powder was molded into a sheet in the same manner as in Example 1, and properties and physical properties were then measured. As a result, flexural stiffness was 5100 kg/cm$^2$ tensile yield strength was 243 kg/cm$^2$, elongation was 763%, and values of Izod impact strength were 67 and 2.8 kg·cm/cm (at 23° C. and −10° C., respectively), and haze was 52.6%.

EXAMPLE 4

In a 5-liter autoclave were placed 1500 g of propylene and 200 g of butene-1, and the same amount of the same catalyst as in Example 2 was injected thereinto at 30° C. Afterward, stirring was carried out at the same temperature for 2 hours so as to effect polymerization, and the unpolymerized monomers were purged. Then, the contents in the autoclave were filtered, washed with hexane (500 ml, 3 times) and dried in the same manner as in Example 2, thereby obtaining 148 g of a powdery co-polymer which was insoluble in hexane. For the thus obtained copolymer, properties and physical properties were measured as in Example 1. As a result, η was 1.33, the butene-1 unit was present in a ratio of 21.5% by weight (17.0 mole %) in the copolymer, a ratio of the intensity of a peak at about 20.2 ppm to the sum of the intensities of the total peaks at about 19–22 ppm was 0.81. According to differential scan thermal analysis, crystallization temperature was 72.3° C. and melting points were 128.5° C. and 119.5° C., and MW/MN was 2.2. The copolymer powder was molded into a sheet in the same manner as in Example 1, and properties and physical properties were then measured. In consequence, flexural stiffness was 5500 kg/cm$^2$, tensile yield strength was 254 kg/cm$^2$, elongation was 780%, and values of Izod impact strength were 66 and 3.2 kg·cm/cm (at 23° C. and −10C, respectively), and haze was 42.3%.

EXAMPLE 5

In a 2-liter autoclave, the same amount of the same catalyst as in Example 1 was dissolved in 1 liter of toluene, and propylene was placed therein at 30° C. until a level of 3 kg/cm$^2$G had been reached. Afterward, 68 g of 4-methylpentene-1 was injected thereinto, and polymerization was carried out at 30° C. for 1 hour, while propylene was added thereto so that polymerization pressure might always be 3 kg/cm$^2$G. After the unpolymerized monomers had been purged, the contents in the autoclave were filtered, washed with toluene (1 liter, 5 times) and dried in the same manner as in Example 1, thereby obtaining 70 g of a powdery copolymer.

According to $^{13}$C-NMR analysis, it was confirmed that the 4-methylpentene-1 unit was present in a ratio of 6.4% by weight (3.3 mole %) in the copolymer, a ratio of the intensity of a peak at about 20.2 ppm to the sum of the intensities of the total peaks at about 19–22 ppm was 0.88, η was 1.05, and MW/MN was 2.0. The copolymer powder was molded into a sheet in the same manner as in Example 1, and properties and physical properties were then measured. As a result, flexural stiffness was 2700 kg/cm$^2$, tensile yield strength was 129 kg/cm$^2$, elongation was 636%, and values of Izod impact strength were 58.4 and 3.4 kg·cm/cm (at 23° C. and −10° C., respectively), and haze was 28%.

EXAMPLE 6

Into a 5-liter autoclave were injected 1000 g of propylene and 300 g of 4-methylpentene-1, and the same amount of the same catalyst as in Example 2 was added thereinto. Afterward, stirring was carried out at 30° C. for 1 hour so as to effect polymerization, and the unpolymerized monomers were purged. Then, the contents in the autoclave were filtered, washed with hexane (500 ml, 3 times) and dried in the same manner as in Example 2, thereby obtaining 150 g of a powdery copolymer. For the thus obtained copolymer and a molded article thereof, properties and physical properties were measured. As a result, η was 0.98, the 4-methylpentene-1 unit was present in a ratio of 12.5% by weight (6.7 mole %) in the copolymer, a ratio of the intensity of a peak at about 20.2 ppm to the sum of the intensities of the total peaks at about 19–22 ppm was 0.83, MW/MN was 2.1, flexural stiffness was 1950 kg/cm$^2$, tensile yield strength was 105 kg/cm$^2$, elongation was 695%, and values of Izod impact strength were 78.2 and 3.3 kg·cm/cm (at 23° C. and −10° C., respectively), and haze was 24%.

EXAMPLE 7

In a 2-liter autoclave, the same amount of the same catalyst as in Example 1 was dissolved in 1 liter of toluene, and propylene was placed therein at 30° C. until a level of 3 kg/cm$^2$G had been reached. Afterward, 68 g of hexene-1 was injected thereinto, and polymerization was carried out at 30° C. for 1 hour, while propylene was added thereto so that polymerization pressure might always be 3 kg/cm$^2$G. After the unpolymerized monomers had been purged, the resulting powdery copolymer was mixed into a large amount of methanol at 25° C., and then filtered to obtain a powder. The latter was then washed with 1 liter of methanol at 25° C. 5 times, and dried at 80° C. under reduced pressure, thereby obtaining 80 g of a copolymer. According to $^{13}$C-NMR analysis, it was confirmed that the hexene-1 unit was present in a ratio of 14.3% by weight (7.7 mole %) in the copolymer, a ratio of the intensity of a peak at about 20.2 ppm to the sum of the intensities of the total peaks at about 19–22 ppm was 0.79, η was 1.18, and MW/MN was 3.9. The copolymer powder was molded into a sheet in the same manner, and properties and physical properties were then measured. As a result, flexural stiffness was 1800 kg/cm$^2$, tensile yield strength was 88 kg/cm$^2$, elongation was 753%, and values of Izod impact strength were 78.9 and 3.0 kg·cm/cm (at 23° C. and −10° C., respectively), and haze was 23%.

EXAMPLE 8

Into a 5-liter autoclave was injected 1500 g of propylene and 300 g of hexene-1, and the same amount of the same catalyst as in Example 2 was added thereto. Afterward, stirring was carried out at 30° C. 1 hour in order to effect polymerization. The unpolymerized propylene was then purged, and the resulting powder was taken out from the autoclave and then dispersed in 500 ml of hexane. The dispersion was filtered at 40° C. and then washed with 500 ml of hexane at 25° C. 3 times. After this washing step, the copolymer was dried at 80° C. under reduced pressure in order to obtain 160 g of a powdery copolymer. For the copolymer and a press-molded sheet thereof, properties and physical properties were measured as in Example 1. As a result, η was 1.18, the hexene-1 unit was present in a ratio of 6.9% by weight (3.6 mole %) in the copolymer, a ratio of the intensity of a peak at about 20.2 ppm to the sum of the intensities of the total peaks at about 19–22 ppm was 0.85, MW/MN was 2.1, flexural stiffness was 2600 kg/cm$^2$, tensile yield strength was 121 kg/cm$^2$, elongation was 680%, and values of Izod impact strength were 48.5 and 3.0 kg cm/cm (at 23° C. and −10° C., respectively), and haze was 28%.

EXAMPLE 9

In 2-liter autoclave, 5 mg of a purified material obtained by recrystallizing isopropyl(cyclopentadienyl-1-fluorenyl) zirconium dichloride used in Example 1 and 0.67 g of methylaluminoxane having a polymerization degree of 16 were dissolved in 1 liter of toluene. Afterward, 40 g of butene-1, 170 g of propylene and 23 g of ethylene were added thereto, and polymerization was carried out at 20° C. for 30 minutes. The unpolymerized monomers were purged, and a large amount of methanol was added to the resulting copolymer, and the solution was afterward filtered at 25° C. to obtain a powder. The latter was then washed with 1 liter of methanol at 25° C. 2 times, and dried at 80° C. under reduced pressure, thereby obtaining 78 g of a copolymer. According to $^{13}$C-NMR analysis, it was confirmed that the ethylene unit was present in a ratio of 8.6% by weight (12.8 mole %) and the butene-1 unit was present in a ratio of 12.9% by weight (9.6 mole %) in the copolymer, a ratio of the intensity of a peak at about 20.2 ppm to the sum of the intensities of the total peaks at about 19–22 ppm was 0.55, η was 0.78, and MW/MN was 2.5. The copolymer powder was molded into a sheet in the similar manner, and properties and physical properties were then measured. As a result, tensile yield strength was 49 kg/cm$^2$, elongation was 137%, and values of Izod impact strength were 28 and 76 kg·cm/cm (at 23° C. and −10° C., respectively), and haze was 18%.

EXAMPLE 10

Into a 5-liter autoclave were injected 650 g of propylene, 60 g of butene-1, 40 g of ethylene and the same amount of the same catalyst as in Example 2 at 30° C. Afterward, stirring was carried out at 30° C. for 30 minutes so as to effect polymerization, and the unpolymerized propylene was then purged. Afterward, the contents in the autoclave were filtered, washed with hexane (500 ml, 3 times) and dried in the same manner as in Example 2, thereby obtaining 295 g of a powdery copolymer.

For the thus obtained copolymer, properties and physical properties were measured in the same manner in Example 1. As a result, η was 0.92, the ethylene unit was present in a ratio of 5.5% by weight (8.2 mole %) and the butene-1 was present in a ratio of 8.5% by weight (6.0 mole %) in the copolymer, a ratio of the intensity of a peak at about 20.2 ppm to the sum of the intensities of the total peaks at about 19–22 ppm was 0.62, and MW/MN was 2.1. The copolymer powder was molded into a sheet in the similar manner, and properties and physical properties were then measured. As a result, tensile yield strength was 68 kg/cm$^2$, elongation was 156%, and values of Izod impact strength were 19 and 48 kg·cm/cm (at 23° C. and −10° C., respectively), and haze was 24%.

EXAMPLE 11

Polymerization and post-treatments were carried out following the same procedure as in Example 10 except that butene-1 was replaced with hexene-1, so that 48 g of a powdery copolymer was obtained. According to $^{13}$C-NMR analysis, it was confirmed that the ethylene unit was present in a ratio of 6.5% by weight (9.7 mole %) and the hexene-1 unit was present in a ratio of 4.8% by weight (2.3 mole %) in the copolymer, a ratio of the intensity of a peak at about 20.2 ppm to the sum of the intensities of the total peaks at about 19–22 ppm was 0.61, η was 0.54, and MW/MN was 2.5. The copolymer powder was molded into a sheet having a thickness of 1 mm in the similar manner, and properties and physical properties were then measured. As a result, tensile yield strength was 87 kg/cm$^2$, elongation was 177%, and values of Izod impact strength were 26 and 58 kg·cm/cm (at 23° C. and −10° C., respectively), and haze was 12%.

EXAMPLE 12

Polymerization and post-treatments were carried out following the same procedure as in Example 9 except that butene-1 was replaced with 4-methylpentene-1, so that 41 g of a powdery copolymer was obtained. According to $^{13}$C-NMR analysis, it was confirmed that the ethylene unit was present in a ratio of 6.2% by weight (9.1 mole %) and the 4-methylpentene-1 unit was present in a ratio of 2.4% by weight (1.2 mole %) in the copolymer, a ratio of the intensity of a peak at about 20.2 ppm to the sum of the intensities of the total peaks at about 19–22 ppm was 0.65, η was 0.43, and MW/MN was 2.2. The copolymer powder was molded into a sheet having a thickness of 1 mm in the similar manner, and properties and physical properties were then measured. As a result, tensile yield strength was 92 kg/cm$^2$, elongation was 163%, and values of Izod impact strength were 24 and 55 kg·cm/cm (at 23° C. and −10° C., respectively), and haze was 14%.

EXAMPLE 13

In an autoclave having an internal capacity of 200 l, were charged 0.2 g of isopropyl(cyclo-pentadienyl-1-fluorenyl) zirconium dichloride—which had been obtained by converting, into a lithium salt, isopropylcyclopentadienyl-1-fluorene, synthesized by a method known per se, reacting the salt with zirconium tetrachloride and then recrystallizing the reaction product-, 30 g of methylaluminoxane (polymerization degree: 16.1) produced by TOSO-AKUZO CORPORATION, and 80 l of toluene. Propylene was then charged to a gauge pressure of 3 kg/cm$^2$-G, followed by polymerization at 20° C. for 2 hours.

After completion of the polymerization, unreacted propylene was purged. To remove inorganic matter, the polymerization mixture was washed with a mixed solvent which consisted of 40 l of methanol and 0.2 l of methyl acetoacetate. The thus-washed mixture was then washed further with 10 l of 3 wt. % hydrochloric acid. The polymerization mixture washed as described above was filtered, whereby 5.6 kg of syndiotactic polypropylene were obtained. The syndiotactic pentad fraction of the polypropylene was 0.935 as measured by $^{13}$C-NMR, the intrinsic viscosity as measured at 135° C. in the form of a tetralin solution was 1.45, and its Mw/Mn value as measured in 1,2,4-trichlorobenzene was 2.2.

The polypropylene was blended with 0.1 wt. % of 2,6-di-tert-butyl-p-cresol as a stabilizer and 0.1 wt. % of talc as a nucleating agent and then granulated. By an apparatus consisting of an extruder having a barrel diameter of 40 mm and a downward die fitted on the extruder, a sheet having a width of 400 mm and a thickness of 0.5 mm was produced at 210° C. and a screw speed of 100 rpm. With respect to the above sheet, the following physical properties were measured.

| Physical property | Unit | Measuring method |
| --- | --- | --- |
| Haze | % | ASTM D-1003 |
| Stress at yield | kg/cm$^2$ | ASTM D-638 |
| Elongation at break | % | ASTM D-638 |
| Tensile modulus | kg/cm$^2$ | ASTM D-638 |

COMPARATIVE EXAMPLE 13

A sheet was produced in a similar manner to Example 13 except for the use of a commercial isotactic polypropylene which had an isotactic pentad fraction of 0.980 as measured by $^{13}$C-NMR, an intrinsic viscosity of 2.20 as measured at 135° C. in the form of a tetralin solution and an Mw/Mn ratio of 5.5 as measured in 1,2,4-trichlorobenzene. The sheet had 58.7% haze, 326 kg/cm$^2$ stress at yield, 954% elongation at break, and 10700 kg/cm$^2$ tensile modulus. The strength was good but the transparency was poor.

EXAMPLE 14

Polymerization was conducted in a similar manner to Example 13 except that the polymerization pressure and temperature were changed to 1 kg/cm$^2$-G and 5° C., whereby a syndiotactic polypropylene was obtained having a syndiotactic pentad fraction of 0.915 as measured by $^{13}$C-NMR, an intrinsic viscosity of 1.71 as measured at 135° C. in the form of a tetralin solution and an Mw/Mn ratio of 1.9 as measured in 1,2,4-trichlorobenzene. The sheet had 12.5% haze, 266 kg/cm$^2$ stress at yield, 720% elongation at break, and 6100 kg/cm$^2$ tensile modulus.

COMPARATIVE EXAMPLE 14

A sheet was produced in a similar manner to Example 13 except for the use of a commercial propylene-ethylene copolymer having an ethylene content of 4.2 wt. % as measured by $^{13}$C-NMR, an intrinsic viscosity of 2.26 as measured at 135° C. in the form of a tetralin solution and an Mw/Mn ratio of 5.5 as measured in 1,2,4-trichlorobenzene. In a $^{13}$C-NMR spectrum of the copolymer, the intensity of an absorption corresponding to the methyl groups of chain units, each consisting of five successive propylene groups arranged as . . . mmmm . . . , was 0.931 of the intensity of an absorption corresponding to the whole methyl groups. The sheet had 36.5% haze, 227 kg/cm$^2$ stress at yield, 912% elongation at break, and 4400 kg/cm$^2$ tensile modulus. The sheet was better in transparency than the sheet of Comparative Example 13, but inferior in both strength and transparency to the sheet of Example 13.

EXAMPLE 15

In an autoclave having an internal capacity of 200 l, were charged 0.1 g of isopropyl(cyclo-pentadienyl-1-fluorenyl) hafnium dichloride—which had been obtained by converting, into a lithium salt, isopropylcyclopentadienyl-1-fluorene, synthesized by a method known per se, reacting the salt with hafnium tetrachloride (content of zirconium tetrachloride: 5 wt. %) and then recrystallizing the reaction product-, 0.1 g of isopropyl(cyclopentadienyl-1-fluorenyl)-zirconium dichloride (synthesized in the same manner as in Example 13 and purified by recrystallization), 30 g of methylaluminoxane (polymerization degree: 16.1; product of TOSO-AKUZO CORPORATION), 4 l of hexene-1, and 80 l of toluene. Propylene was then charged to a gauge pressure of 3 kg/cm$^2$-G, followed by polymerization at 20° C. for 2 hours.

After completion of the polymerization, the polymerization mixture was treated in a similar manner to Example 13 so that a copolymer having a hexene-1 unit content of 6 wt. % was obtained. According to $^{13}$C-NMR, the peak intensity of the copolymer at about 20.2 ppm was 0.68 of the whole peak intensity of the methyl groups of the propylene units. This indicated that the copolymer substantially had a syndiotactic structure. Its Mw/Mn ratio was 4.5.

The copolymer was added with the same additives as those employed in Example 13. By a similar extrusion procedure to Example 13, a sheet having a thickness of 0.5 mm was produced from the copolymer. Its physical properties were measured. The following results were obtained.

| Haze: | 8% |
|---|---|
| Stress at yield: | 140 kg/cm$^2$ |
| Elongation at break: | 580% |
| Tensile modulus: | 2,300 kg/cm |

COMPARATIVE EXAMPLE 15

A blown film was produced in a similar manner to Example 16 except for the use of an ordinary isotactic polypropylene which had an isotactic pentad fraction of 0.980 as measured by $^{13}$C-NMR, an intrinsic viscosity of 1.52 as measured at 135° C. in the form of a tetralin solution and an Mw/Mn ratio of 4.8 as measured in 1,2,4-trichlorobenzene. The blown film had 5.0% haze, 78 kg·cm/mm (23° C.) and 1.5 kg·cm/mm (−5° C.) impact strength, 80 kg/cm$^2$ Young's modulus, and 2.31 kq/cm$^2$ stress at yield. The tensile strength was substantially unchanged, but the haze and low-temperature impact strength were inferior.

EXAMPLE 16

Using a blown-film extruder having a barrel diameter of 40 mm ("BDTK-40S", trade name; manufactured by Kawata Seisakusho K.K.), a blown film having a thickness of 0.005 mm was produced at a resin temperature of 240° C., a coolant water temperature of 20° C., a take-up speed of 4 m/min, an extruder temperature of 220° C. and a die temperature of 210° C. from the same syndiotactic polypropylene composition as that employed for the production of the sheet in Example 13. The following physical properties were measured.

| Physical property | Unit | Measuring method |
|---|---|---|
| Haze | % | ASTM D-1003 |
| Impact strength | kg · cm/mm | Mitsui-Toatsu method* |

*Under a load, a ball having a diameter of ½ inch is caused to strike a 10 cm by 10 cm square film of a desired thickness in accordance with the principle of the pendulum to determine the breaking energy at break of the film. The impact strength of the film is calculated in accordance with the following formula:

$$\text{Impact strength (kg·cm/mm)} = \frac{\text{Breaking energy (kg·cm)}}{\text{Film thickness (mm)}}$$

| Young's modulus | kg/cm$^2$ | ASTM D-882 |
| Stress at yield | kg/cm$^2$ | ASTM D-882 |

The blown film had 3.7% haze, 80 kg·cm/mm (23° C.) and 16 kg·cm/mm (−5° C.) impact strength, 73 kg/cm$^2$ Young's modulus, and 2.23 kg/cm$^2$ stress at yield.

COMPARATIVE EXAMPLE 16

A blown film was produced in a similar manner to Example 16 except for the use of a commercial propylene-ethylene copolymer having an ethylene content of 2.3 wt. % as measured by $^{13}$C-NMR, an intrinsic viscosity of 1.57 as measured at 135° C. in the form of a tetralin solution and an Mw/Mn ratio of 5.3 as measured in 1,2,4-trichlorobenzene. In a $^{13}$C-NMR spectrum of the copolymer, the intensity of an absorption corresponding to the methyl groups of chain units, each consisting of five successive propylene groups arranged as . . . mmmm . . . , was 0.965 of the intensity of an absorption corresponding to the whole methyl groups. The blown film had 5.0% haze, 82 kg·cm/mm (23° C.) and 18 kg·cm/mm (−5° C.) impact strength, 62 kg/cm² Young's modulus, and 2.01 kg/cm² stress at yield. The low-temperature impact strength was improved, but the tensile strength was inferior and the haze was poor.

EXAMPLE 17

In a similar manner to Example 16, a blown film was produced using the same syndiotactic polypropylene as that employed in Example 14.

The blown film had 3.8% haze, 85 kg·cm/mm (23° C.) and 24 kg·cm/mm (−5° C.) impact strength, 77 kg/cm² Young's modulus, and 2.31 kg/cm² stress at yield.

EXAMPLE 18

In a similar manner to Example 16, a blown film was produced using the same syndiotactic propylene-hexene-1 copolymer as that employed in Example 15.

The blown film had 1.8% haze, 95 kg·cm/mm (23° C.) and 35 kg·cm/mm (−5° C.) impact strength, 32 kg/cm² Young's modulus, and 1.95 kg/cm² stress at yield.

EXAMPLE 19

The procedure of Example 13 was repeated except that 30 parts by weight of a commercial isotactic polypropylene having an isotactic pentad fraction of 0.962 as measured by $^{13}$C-NMR and an intrinsic viscosity $\eta$ of 1.62 as measured at 135° C. in tetralin were mixed to 70 parts by weight of the syndiotactic polypropylene obtained in Example 13. The resulting sheet had 5.2% haze, 265 kg/cm² stress at yield, 650% elongation at break, and 7100 kg/cm² tensile modulus.

EXAMPLE 20

Using a polypropylene composition similar to that employed in Example 19, a blown film was produced in a similar manner to Example 16. The blown film had 3.8% haze, 75 kg·cm/mm (23° C.) and 16 kg·cm/mm (−5° C.) impact strength, 76 kg/cm² Young's modulus, and 2.25 kg/cm² stress at yield.

What is claimed is:

1. An extruded article formed by the extrusion of a syndiotactic propylene homopolymer having a syndiotactic pentad fraction of at least 0.7.

2. An extruded article formed by the extrusion of a syndiotactic propylene copolymer whose peak intensity observed at about 20.2 ppm on a $^{13}$C-NMR absorption spectrum as measured in the form of a 1,2,4-trichlorobenzene solution while using tetramethylsilane as a standard is at least 0.5 of the sum of all peak intensities corresponding to the respective methyl groups of propylene.

3. The extruded article of claim 2, which is a film or sheet having a thickness of 0.005–5 mm.

4. The extruded article of claim 2, which is a blown film having a thickness of 0.001–1 mm.

5. The extruded article of claim 2, wherein the propylene copolymer contains not more than 20 wt. % of olefin units other than propylene units, said olefin units containing 2–25 carbon atoms.

6. A blown film 0.001–1 mm thick formed by extruding, in a cylindrical form, polypropylene having a syndiotactic pentad fraction of at least 0.7 and blowing an inert gas into the cylindrical extrudate.

7. A sheet 0.005–5 mm thick formed by extrusion of polypropylene having a syndiotactic pentad fraction of at least 0.7.

8. A syndiotactic propylene copolymer comprising 70 to 99 mole % of propylene and 1 to 30 mole % of an olefin other than propylene wherein in the $^{13}$C-NMR spectrum of said syndiotactic propylene copolymer, said copolymer exhibits a ratio of the intensity of a peak at about 20.2 ppm to the sum of the intensities of the total peaks attributable to methyl groups in propylene units at about 19–22 ppm of 0.3 or more.

9. A syndiotactic propylene copolymer according to claim 8, wherein said olefin other than propylene is an α-olefin having 2 or 4 to 25 carbon atoms.

10. A syndiotactic propylene copolymer according to claim 9, comprising 73 to 99 mole % of propylene and 1 to 27 mole % of ethylene wherein in the $^{13}$C-NMR spectrum of said syndiotactic propylene copolymer, said copolymer exhibits a ratio of the intensity of a peak at about 20.2 ppm to the sum of the intensities of the total peaks attributable to methyl groups in propylene units at about 19–22 ppm of 0.5 or more.

11. A syndiotactic propylene copolymer according to claim 9, comprising 76 to 99 mole % of propylene and 1 to 24 mole % of butene wherein in the $^{13}$C-NMR spectrum of said syndiotactic propylene copolymer, said copolymer exhibits a ratio of the intensity of a peak at about 20.2 ppm to the sum of the intensities of the total peaks attributable to methyl groups in propylene units at about 19–22 of 0.5 or more.

12. A syndiotactic propylene copolymer according to claim 9, comprising 82 to 99 mole % of propylene and 1 to 18 mole % of 4-methylpentene-1 wherein in the $^{13}$C-NMR spectrum of said syndiotactic propylene copolymer, said copolymer exhibits a ratio of the intensity of a peak at about 20.2 ppm to the sum of the intensities of the total peaks attributable to methyl groups in propylene units at about 19–22 ppm of 0.5 or more.

13. A syndiotactic propylene copolymer according to claim 9, comprising 84 to 99 mole % of propylene and 1 to 16 mole % of hexene-1 wherein in the $^{13}$C-NMR spectrum of said syndiotactic propylene copolymer, said copolymer exhibits a ratio of the intensity of a peak at about 20.2 ppm to the sum of the intensities of the total peaks attributable to methyl groups in propylene units at about 19–22 ppm of 0.5 or more.

14. A syndiotactic propylene copolymer according to claim 9, comprising 1 to 29 mole % of ethylene, 1 to 14 mole % of butene and the balance of propylene.

15. A syndiotactic propylene copolymer according to claim 9, comprising 1 to 30 mole % of ethylene, 1 to 10 mole % of an α-olefin having 6 carbon atoms and the balance of propylene.

16. A process for the preparation of the copolymer of claim 11 comprising the polymerization of propylene and butene with catalysts obtained from isopropyl (cyclopentadienyl-1-fluorenyl) hafnium dichloride or isopropyl (cyclopentadienyl-1-fluorenyl) zirconium dichloride and polymethylaluminoxane cyclic or linear compounds of the formula

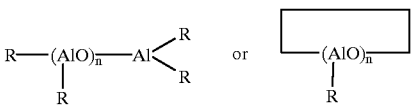

where n is at least 5, operating under conditions where the ratio of butene to the total constitutional monomer units of the copolymer is from 1 to 24 mole %, and the polymerization is conducted in the liquid phase, at a temperature of from −100° C. to 100° C.

* * * * *

UNITED STATES PATENT AND TRADEMARK OFFICE
CERTIFICATE OF CORRECTION

PATENT NO.    : 6,255,425 B1
DATED         : July 3, 2000
INVENTOR(S)   : Tadashi Asanuma It is certified that error appears in the above-identified patent and that said Letters Patent is hereby corrected as shown below:

Column 18,
Lines 55-60, replace the first formula as follows:

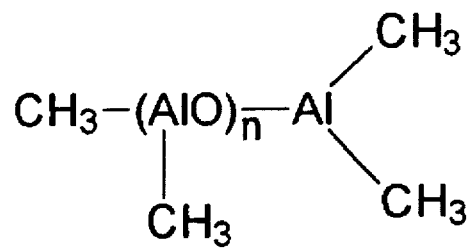

Signed and Sealed this

Second Day of April, 2002

Attest:

JAMES E. ROGAN
*Attesting Officer*      *Director of the United States Patent and Trademark Office*